United States Patent
Gallegos et al.

(10) Patent No.: US 12,098,788 B2
(45) Date of Patent: Sep. 24, 2024

(54) CONDUIT MOUNT BRACKET

(71) Applicant: Unirac Inc., Albuquerque, NM (US)

(72) Inventors: Ernest Gallegos, Albuquerque, NM (US); Jeffrey Ballard, Albuquerque, NM (US); Nathan Schuit, Moriarty, NM (US)

(73) Assignee: Unirac, Inc., Albuquerque, NM (US)

( * ) Notice: Subject to any disclaimer, the term of this patent is extended or adjusted under 35 U.S.C. 154(b) by 127 days.

(21) Appl. No.: 17/479,942

(22) Filed: Sep. 20, 2021

(65) Prior Publication Data

US 2022/0074521 A1 Mar. 10, 2022

Related U.S. Application Data

(63) Continuation of application No. 16/432,887, filed on Jun. 5, 2019, now Pat. No. 11,125,356.

(51) Int. Cl.
*F16L 3/10* (2006.01)

(52) U.S. Cl.
CPC ........... *F16L 3/1075* (2013.01); *F16L 3/1058* (2013.01)

(58) Field of Classification Search
CPC ..... F16L 3/1075; F16L 3/1058; F16L 3/1083; F16L 3/12; F16L 3/233; F16L 3/1025; F16L 3/1091; F16L 3/137; Y10T 24/44017; Y10T 24/44026; Y10T 24/44274
USPC ............................................... 248/74.1–74.5
See application file for complete search history.

(56) References Cited

U.S. PATENT DOCUMENTS

| | | | | |
|---|---|---|---|---|
| 3,098,273 | A | * | 7/1963 | Cochran ............... F16L 3/04 248/71 |
| 3,429,985 | A | * | 2/1969 | Czigler ............... F16L 3/12 174/164 |
| 3,554,474 | A | * | 1/1971 | Davies ............ F16L 3/1058 248/83 |
| 3,565,375 | A | * | 2/1971 | Babb ................. F16L 3/133 248/70 |
| 3,954,238 | A | | 5/1976 | Nivet |
| 4,439,896 | A | | 4/1984 | Matsui |
| 4,445,656 | A | | 5/1984 | Leitch et al. |
| 4,564,163 | A | * | 1/1986 | Barnett ............... H02G 3/32 24/297 |
| 4,609,171 | A | * | 9/1986 | Matsui ............... H02G 3/32 248/316.1 |
| 4,766,651 | A | | 8/1988 | Kobayashi et al. |
| 4,779,828 | A | | 10/1988 | Munch |

(Continued)

OTHER PUBLICATIONS

Office Action for U.S. Appl. No. 16/432,887, mailed on Dec. 17, 2020, Gallegos, "Conduit Mount Bracket", 23 Pages.

*Primary Examiner* — Ingrid M Weinhold
(74) *Attorney, Agent, or Firm* — Lee & Hayes, P.C.

(57) ABSTRACT

A conduit mount including a bracket and a clip. The bracket is defined at least by a first arm, a second arm, and a horizontal portion joining the first arm to the second arm. The bracket includes, a slot located on the first arm, a first catch disposed on the second arm proximate a distal end of the second arm, and a second catch disposed on the second arm and spaced a distance apart from the first catch. The clip includes a first end and a second end. The clip further includes a retaining member disposed on the first end of the clip and shaped to be insertable through the slot in the bracket. The clip also includes a hook disposed on the second end of the clip that optionally engages the first catch or the second catch.

16 Claims, 5 Drawing Sheets

(56) References Cited

U.S. PATENT DOCUMENTS

| | | | |
|---|---|---|---|
| 4,802,646 A | 2/1989 | Cattani | |
| 4,840,345 A * | 6/1989 | Neil | F16L 3/12 24/458 |
| 5,184,794 A * | 2/1993 | Saito | F16L 3/13 248/74.1 |
| 5,301,916 A * | 4/1994 | Schmidt | B60R 1/002 248/475.1 |
| 5,305,978 A | 4/1994 | Current | |
| 5,622,341 A | 4/1997 | Stana | |
| 5,653,411 A | 8/1997 | Picco et al. | |
| 5,906,341 A * | 5/1999 | Brown | F16L 3/227 248/68.1 |
| D414,404 S * | 9/1999 | van de Lande | D8/396 |
| 6,076,778 A * | 6/2000 | Brown | F16L 3/227 248/70 |
| 6,079,674 A | 6/2000 | Snyder | |
| D448,657 S | 10/2001 | Calvert | |
| 6,935,599 B2 * | 8/2005 | van Walraven | B29C 45/00 403/339 |
| D521,366 S | 5/2006 | Polak et al. | |
| D580,748 S | 11/2008 | Polak et al. | |
| 7,866,099 B2 | 1/2011 | Komamine et al. | |
| 7,963,487 B2 | 6/2011 | Saltenberger et al. | |
| 8,469,061 B2 | 6/2013 | Thuesen | |
| 8,672,276 B2 | 3/2014 | Fukumoto | |
| 8,882,072 B2 | 11/2014 | Hattori et al. | |
| 8,938,932 B1 | 1/2015 | Wentworth et al. | |
| D730,724 S * | 6/2015 | Brown | F24F 13/32 D8/380 |
| 9,106,069 B2 * | 8/2015 | Frizzell | H02G 3/32 |
| 9,303,792 B2 * | 4/2016 | Heims | F16L 3/243 |
| 9,441,763 B2 * | 9/2016 | Denner | F16L 3/127 |
| 9,523,380 B2 * | 12/2016 | Brown | F16L 3/1058 |
| 9,797,527 B2 * | 10/2017 | Dworak, Jr. | F16L 3/245 |
| 9,825,581 B2 | 11/2017 | Wildes | |
| 10,378,679 B2 * | 8/2019 | Booth | F16L 3/1091 |
| D938,813 S * | 12/2021 | Newton | D8/394 |
| 2004/0262462 A1 * | 12/2004 | Polak | H02G 3/30 248/74.1 |
| 2006/0006292 A1 * | 1/2006 | Kleeb | F16L 3/1075 248/74.1 |
| 2006/0151674 A1 | 7/2006 | Hancock | |
| 2008/0083093 A1 | 4/2008 | Saltenberger et al. | |
| 2011/0126934 A1 | 6/2011 | Thuesen | |
| 2012/0073220 A1 | 3/2012 | Kobayashi et al. | |
| 2012/0073237 A1 * | 3/2012 | Brown | F16L 3/00 248/65 |
| 2013/0168510 A1 * | 7/2013 | Dworak, Jr. | F16L 3/1083 29/525.01 |
| 2013/0313375 A1 * | 11/2013 | Dworak, Jr. | F16L 3/1083 248/74.1 |
| 2016/0003377 A1 | 1/2016 | Denner et al. | |
| 2020/0158263 A1 | 5/2020 | Kim et al. | |
| 2020/0370680 A1 | 11/2020 | Hui et al. | |
| 2020/0386347 A1 | 12/2020 | Gallegos et al. | |

* cited by examiner

CONDUIT MOUNT BRACKET

RELATED APPLICATIONS

This application is a continuation of, and claims priority to, U.S. patent application Ser. No. 16/432,887 (now U.S. Pat. No. 11,125,356), filed Jun. 5, 2019, and entitled "Conduit Mount Bracket," the entire contents of which are incorporated herein by reference.

BACKGROUND

The solar energy industry is rapidly growing and, as such, photovoltaic (PV) modules are being mounted to various types of structures and/or locations. Often, PV modules are mounted to a roof of a structure in a city or in residential environments. PV modules may be installed on a roof because a roof may provide an unshaded, sturdy, out-of-the way location to install the PV modules. However, when mounting PV modules on a roof, there may be limited space for other components such as conduits, junction boxes, control panels, wiring, etc. Furthermore, conduit and/or wiring may be damaged or ruined if mounted directly to a roof due to water or other damage. In some cases, mounting additional components may require drilling additional holes in a roof, thereby increasing the risk of creating leaks in the roof.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

DETAILED DESCRIPTION

As described previously, the solar energy industry is growing and, as it grows, photovoltaic (PV) modules (e.g., solar panels) are being implemented in residential applications as well as in commercial applications. In either application, PV modules may be implemented in a location that may have limited space (e.g., a roof, side of a building, etc.). As such, installers may desire to use the majority of space for the PV modules themselves. Furthermore, when mounting PV modules and their respective components to a structure, installers typically desire to minimize the number of holes that must be drilled in a structure in order to minimize the risk of creating leaks, among other possible issues. As mentioned previously, electrical conduits and/or other components may need to be disposed away from the surface of a structure to minimize water damage (or other weather-related damage) that may occur.

This disclosure is directed to a conduit mount. More specifically, this disclosure describes a conduit mount that may be mounted to other roof mounted systems (e.g., PV module mounting assemblies and/or components). In an embodiment, the conduit mount described herein may reduce the number of holes that are drilled in order to mount certain components (e.g., conduit) on a structure. Furthermore, the conduit mount may mount an electrical conduit (or other conduit) away from a roof and/or wall of a structure, thereby reducing the risk of damaging the conduit and/or other PV module component.

The conduit mount described herein may include a bracket and a clip that attaches thereto in order to hold a conduit between the bracket and the clip. In an embodiment, the bracket of the conduit mount may include multiple latching points to which the clip may attach to accommodate multiple sizes of conduit. Furthermore, the clip of the conduit mount may be shaped such that the clip maintains a position of the conduit under a compressive force providing a secure mount for the conduit. In an embodiment, the conduit mount can be mounted directly to flashing, an L-foot bracket, and/or a rail. Additionally, and/or alternatively, the conduit mount may be mounted to any type of mounting hardware. Still further, the conduit mount may be mounted to hardware that enables directional adjustment of the conduit mount. In an embodiment, the conduit mount may be made, at least in part, of a metal, such as aluminum, steel, etc. Additionally, and/or alternatively, the conduit mount may include other suitable materials such as polymers, composites, etc.

Figure 1:
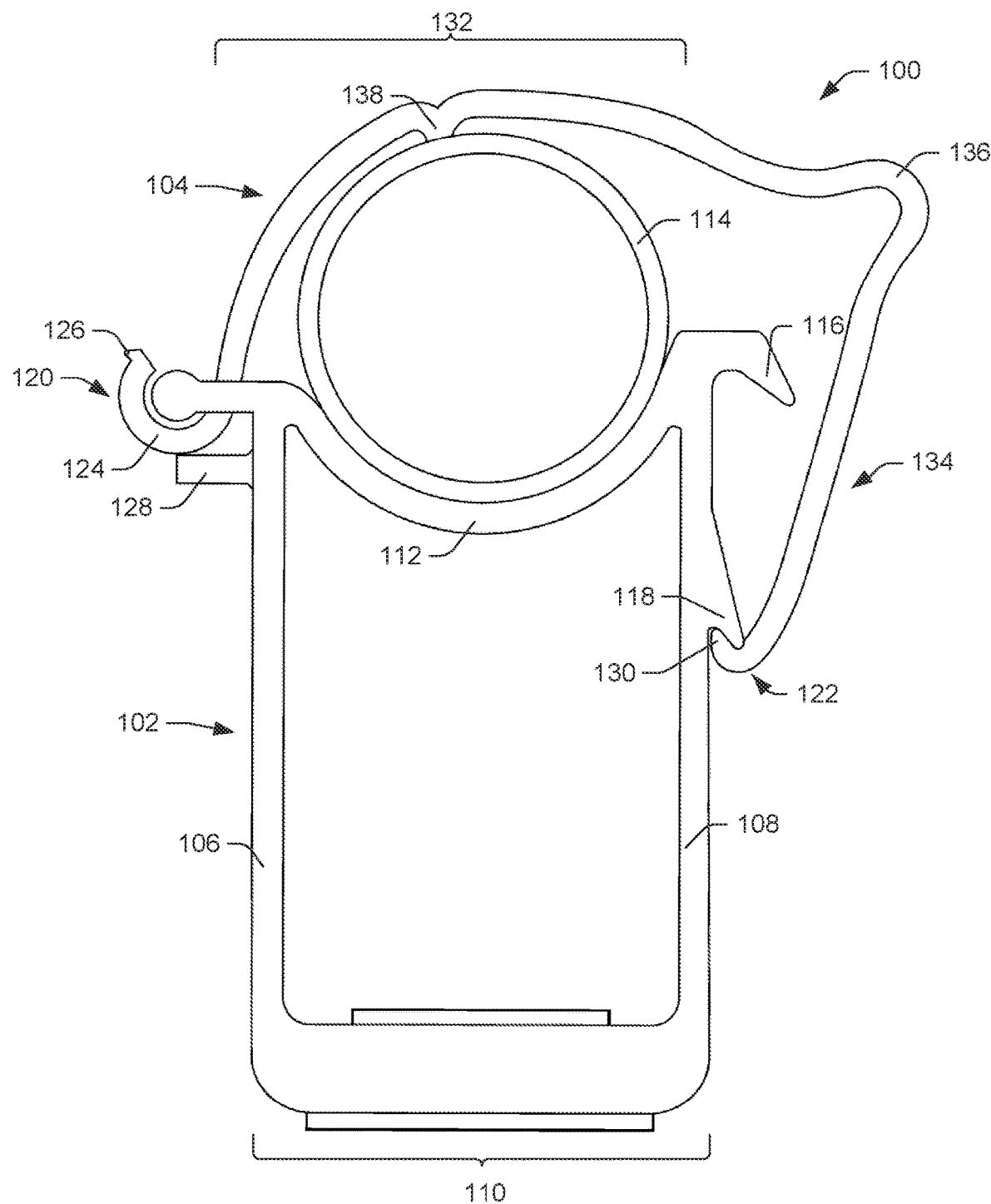
FIG. 1 is a plan view of a conduit mount including conduit having a first size mounted therein according to an embodiment of this disclosure.

FIG. 1 illustrates a plan view of a conduit mount 100. As shown in FIG. 1, the conduit mount 100 may include a bracket 102 and a clip 104 in an embodiment. The bracket 102 may include a first arm 106 and a second arm 108 that may be joined by a horizontal portion 110 (also referred to herein as a "connecting portion" or a "base"). Additionally, and/or alternatively, the bracket 102 may further include a cradle portion 112. In an embodiment, the cradle portion 112 may span a distance between the first arm 106 and the second arm 108 and may be shaped to accommodate a shape of a conduit 114 therebetween. Though shown as a cylindrical shape, the shape of conduit 114 may vary as other geometric shapes. The cradle portion 112 may be located on the bracket 102 opposite the horizontal portion 110. In an embodiment where the conduit to be secured has a cylindrical shape, the cradle portion 112 may have a radius of curvature corresponding to that of the conduit to accommodate the conduit securely. Thus, the radius of the cradle portion 112 may vary depending on the size of conduit 114 held therein.

As shown in FIG. 1, the bracket 102 may include at least a first catch 116 and a second catch 118 disposed on the second arm 108 of the bracket 102. In an embodiment, the bracket 102 may include less than two catches or more than two catches. For example, the bracket 102 may include various catches to accommodate different sizes of conduit 114. As shown in FIG. 1, the first catch 116 may be disposed on the second arm 108 proximate a distal end of the second arm 108. Further shown in FIG. 1, the second catch 118 may be disposed on the second arm 108 spaced a distance apart from the first catch 116. The exact spacing between multiple catches on the second arm 108 may vary depending on the size(s) of conduit 114 commonly held by the conduit mount 100. The bracket 102 may further include a slot (not shown in FIG. 1 but shown and described further herein below with respect to FIG. 5) located on the first arm 106. The slot may be shaped to receive at least a portion of the clip 104. In an embodiment, the slot may be located on a flange portion of the first arm 106, where the flange extends in a direction transverse to the general direction of extension of the first arm 106.

In an embodiment, the clip 104 of the conduit mount 100 may include a first end 120 and a second end 122. The first end 120 of the clip 104 may include a retaining member 124 that is located on the first end 120 of the clip 104. In an embodiment, the retaining member 124 may be shaped to be insertable through the slot (described above) to retain the first end 120 of the clip 104 on the bracket 102. For example, the retaining member 124 may be curved such that the retaining member 124 forms at least a half circle (and/or almost a complete circle). As shown in FIG. 1, the retaining member 124 may include a tab 126 that extends outward from the retaining member 124. The bracket 102 may further include a stop 128 that extends laterally outward (or transverse) from the first arm. In an embodiment, the stop 128 may engage the tab 126 and prevent the retaining member from backing out of the slot thereby maintaining at least the first end 120 of the clip 104 on the bracket 102. The clip 104 may further include a hook 130 disposed on the second end 122 of the clip 104. The hook 130 may be shaped to engage with the first catch 116 and the second catch 118 of the bracket 102, when the clip is rotationally manipulated about the connection point between the retaining member 124 and the first arm 106. In an embodiment, the hook 130 may optionally engage either the first catch 116 or the second catch 118 depending on the size of conduit 114 held between the clip 104 and the bracket 102.

As shown in FIG. 1, the clip 102 may include a curved portion 132 that is curved to generally correspond with a shape of the conduit 114. Additionally, and/or alternatively, the curved portion 132 may take any shape to accommodate conduit 114 held therein. The clip 102 may further include a substantially planar portion 134, where the plane extends into the page of FIG. 1. That is, planar portion 134 has a substantially linear profile compared to the curved profile of the curved portion 132. The clip 104 may act like a spring in that it stretches to engage the catches but will return to its original shape (or neutral state) if unhooked from the catch. This spring action of the clip 104 provides a secure way of maintaining a conduit 114 between the clip 104 and the bracket 102 under compression. In an embodiment, the spring action of the clip 104 may be provided by the clip 104 being formed by a single piece of material. For example, the curved portion 132 may be joined to the planar portion 134 via a kink (or pinch) 136 in the clip 104. The kink 136 may act like a spring between the curved portion 132 and the planar portion 134. That is to say, the kink 136 may stretch (or deform) when the hook 130 engages either the first catch 116 or the second catch 118 and may return to a neutral position when the hook 130 disengages either catch. The clip 104 may further include a protrusion 138 disposed on the curved portion 132 and extending inward from the clip 104. The protrusion 138 may press against the conduit 114 when the hook 130 is engaged with either the first catch 116 or the second catch 118. In an embodiment, the protrusion 138 may contact a sidewall of the conduit 114 to ensure that the conduit 114 is held securely in the cradle portion 112.

Figure 2:
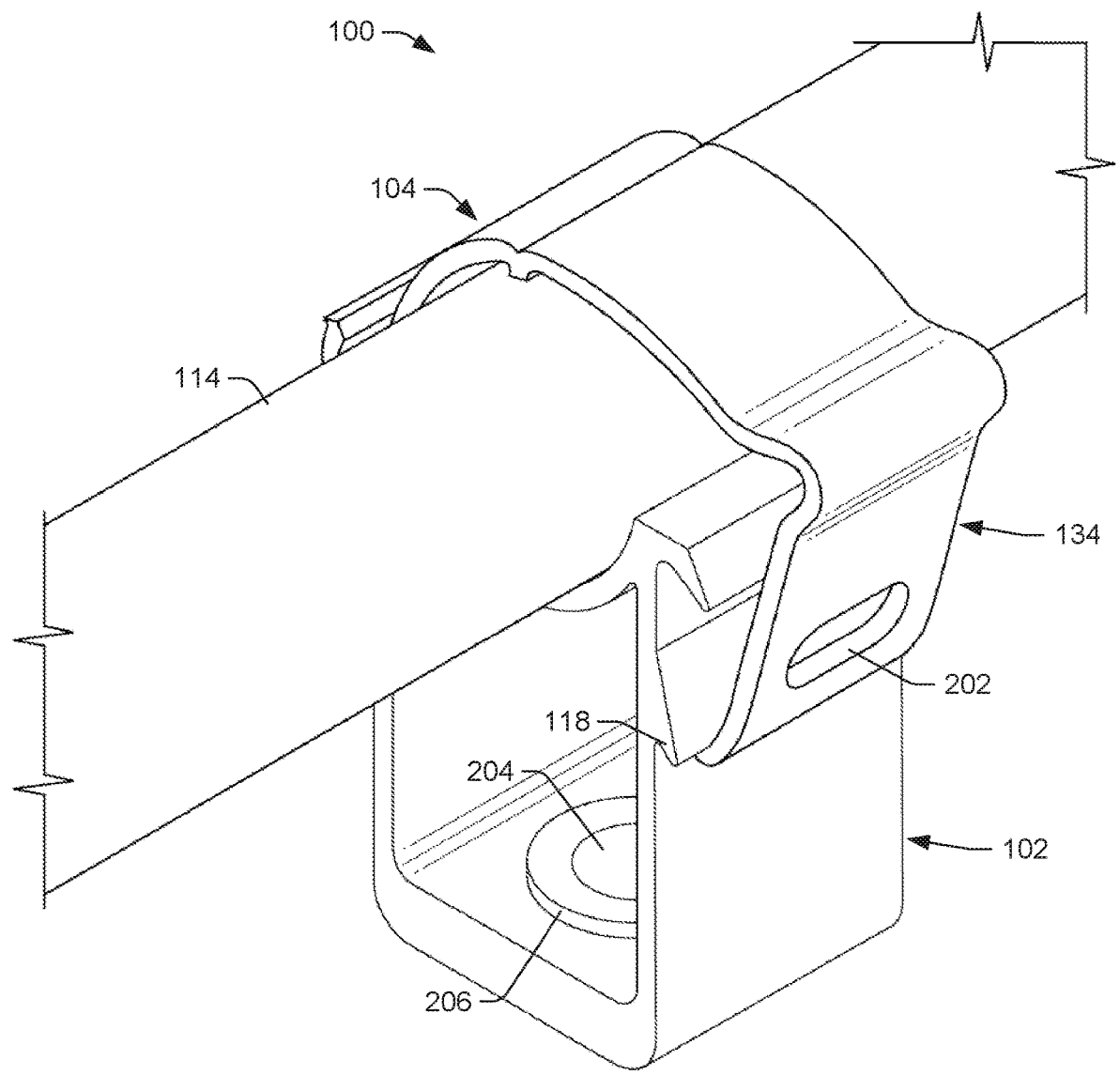
FIG. 2 is a perspective view of a conduit mount including conduit having a first size mounted therein according to an embodiment of this disclosure.

FIG. 2 illustrates a perspective view of the conduit mount 100 as shown and described in FIG. 1. FIG. 2 depicts the conduit mount 100 including conduit 114 having a first size. As described previously, the conduit mount 100 is able to accommodate conduit having differing sizes due to the multiple catches and flexibility of the clip 104. As shown in FIG. 2, when the conduit mount 100 secures a relatively smaller conduit, the clip 104 may hook onto the second catch point 118. The first size of conduit may include a diameter between approximately 0.10 inches and approximately 1.5 inches, between approximately 0.25 inches and approximately 1.25 inches, or between approximately 0.5 inches and approximately 1 inch. In an embodiment, the conduit 114 having a first size may include a diameter of approximately 0.75 inches (+/−0.15 inches). However, the conduit mount 100 is not be limited to the above described conduit sizes. The conduit mount 100 may be scaled up or down to include catches to accommodate conduit having any diameter. As further shown in FIG. 2, the clip 104 may include an aperture 202 located on the planar portion 134 of the clip 104. The aperture 202 on the clip 104 may allow a user to insert a tool to assist in unlatching the clip 104 from the bracket 102, thereby releasing force against the conduit 114. The bracket 102 may also include an aperture 204 located in the horizontal portion 110 of the bracket 102. The aperture 204 in the bracket 102 may include a grommet 206 disposed therein. In an embodiment, the grommet 206 may include a polymer or metallic material. The aperture 204 in the bracket 102 may be sized to accommodate a fastener (not shown) therethrough to mount the conduit mount 100 to other mounting hardware and/or other structure(s). Example fasteners may include bolts, lag bolts, screws, etc.

Figure 3:
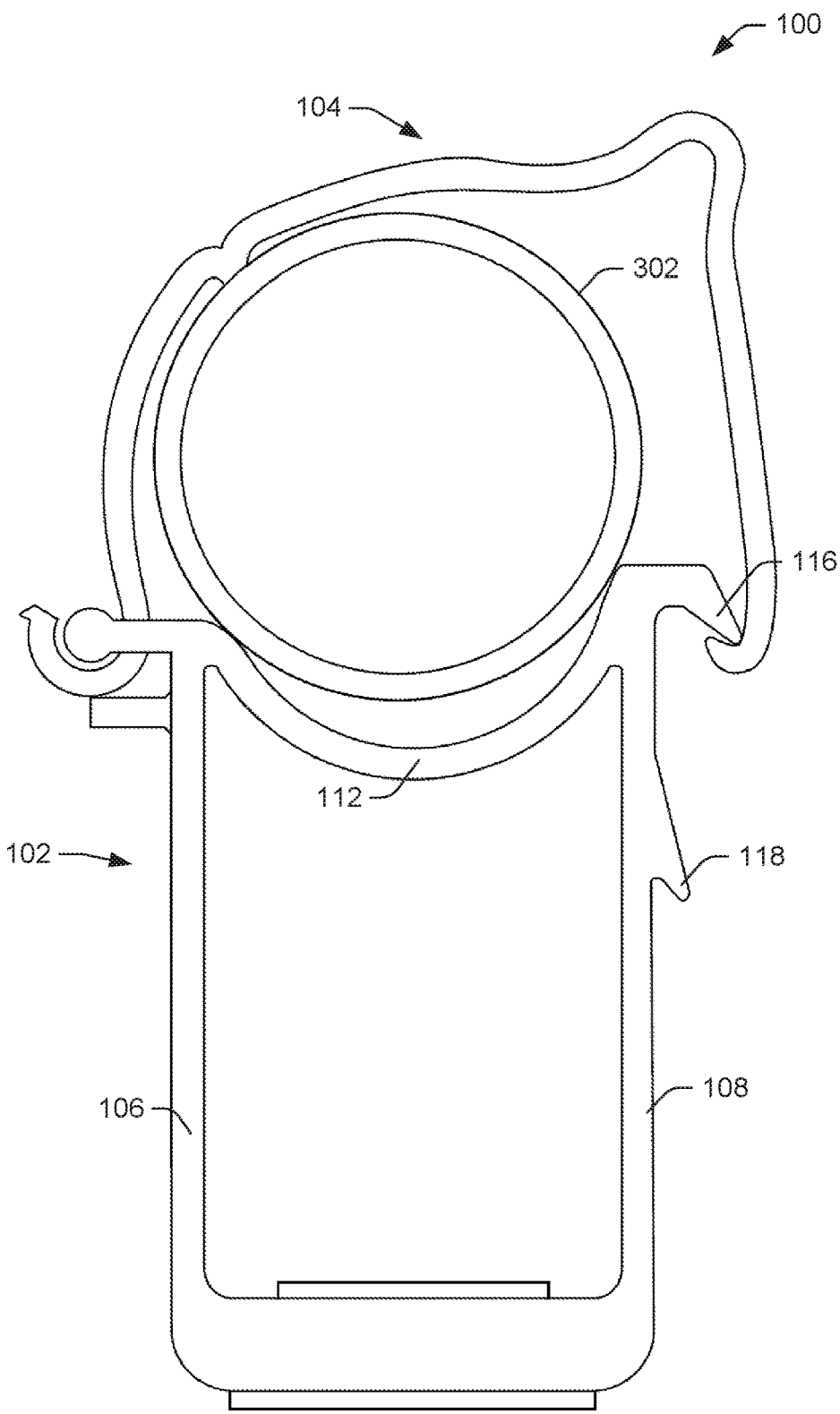
FIG. 3 is a plan view of a conduit mount including conduit having a second size mounted therein according to an embodiment of this disclosure.

FIG. 3 illustrates a plan view of the conduit mount 100. The conduit mount 100 described in FIG. 3 may be similar to (or the same as) the conduit mount described above with respect to FIGS. 1 and 2. As shown in FIG. 3, the conduit mount 100 may accommodate conduit 302 having a second size. That is to say, the conduit mount 100 may accommodate conduit 302 having a larger diameter than described previously. In an embodiment, the conduit mount 300 may accommodate a larger diameter conduit 302 by hooking the clip 104 to the first catch 116 rather than the second catch 118. While a larger diameter conduit 302 may not exactly correspond with the size and shape of the cradle portion 112, the cradle portion 112 still provides a stable position to receive at least a portion of the conduit 302 between the first arm 106 and the second arm 108 of the bracket 102 of the conduit mount 100.

Figure 4:
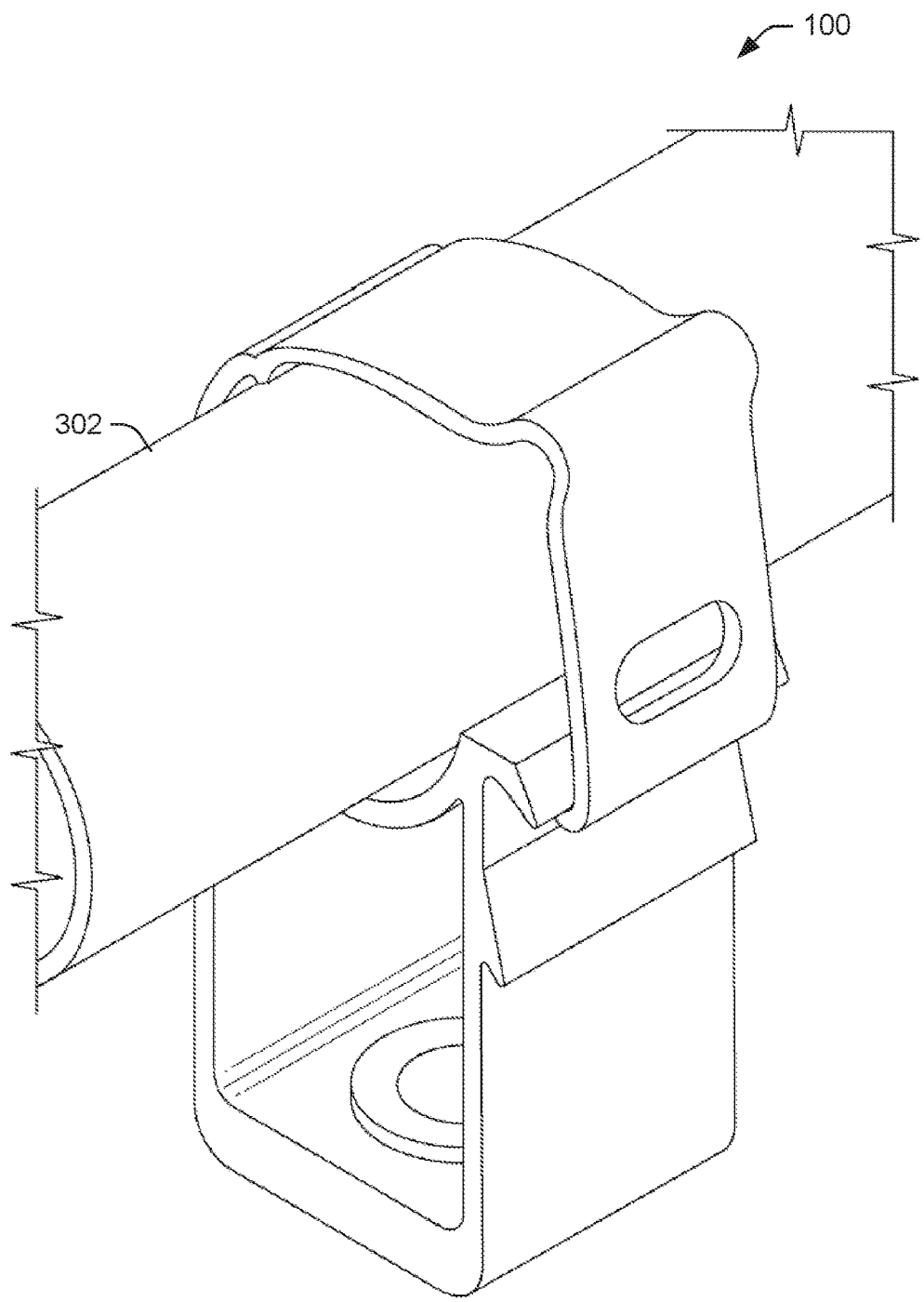
FIG. 4 is perspective view of a conduit mount including conduit having a second size mounted therein according to an embodiment of this disclosure.

FIG. 4 illustrates a perspective view of the conduit mount 100 as shown and described in FIG. 3. As described above, FIG. 4 depicts the conduit mount 100 including conduit 302 having a second size, wherein the second size may be greater than the first size described above with respect to FIGS. 1 and 2. The conduit 302 having a second size shown in FIG. 4 may include a diameter between approximately 0.25 inches and approximately 1.75 inches, between approximately 0.5 inches and approximately 1.5 inches, or between approximately 0.75 inches and approximately 1.25 inches. In an embodiment, the conduit 302 having a second size may include a diameter of approximately 1 inch (+/−0.15 inches). While the conduit shown in FIGS. 1-4 is shown as being substantially circular, the conduit mount described herein may be able to accommodate conduit having various shapes and sizes. Furthermore, while the conduit mount is described as having two catches to accommodate conduit having two predetermined sizes, the conduit mount may include more than two catches or a single catch to accommodate further or fewer sizes of conduit.

Figure 5:
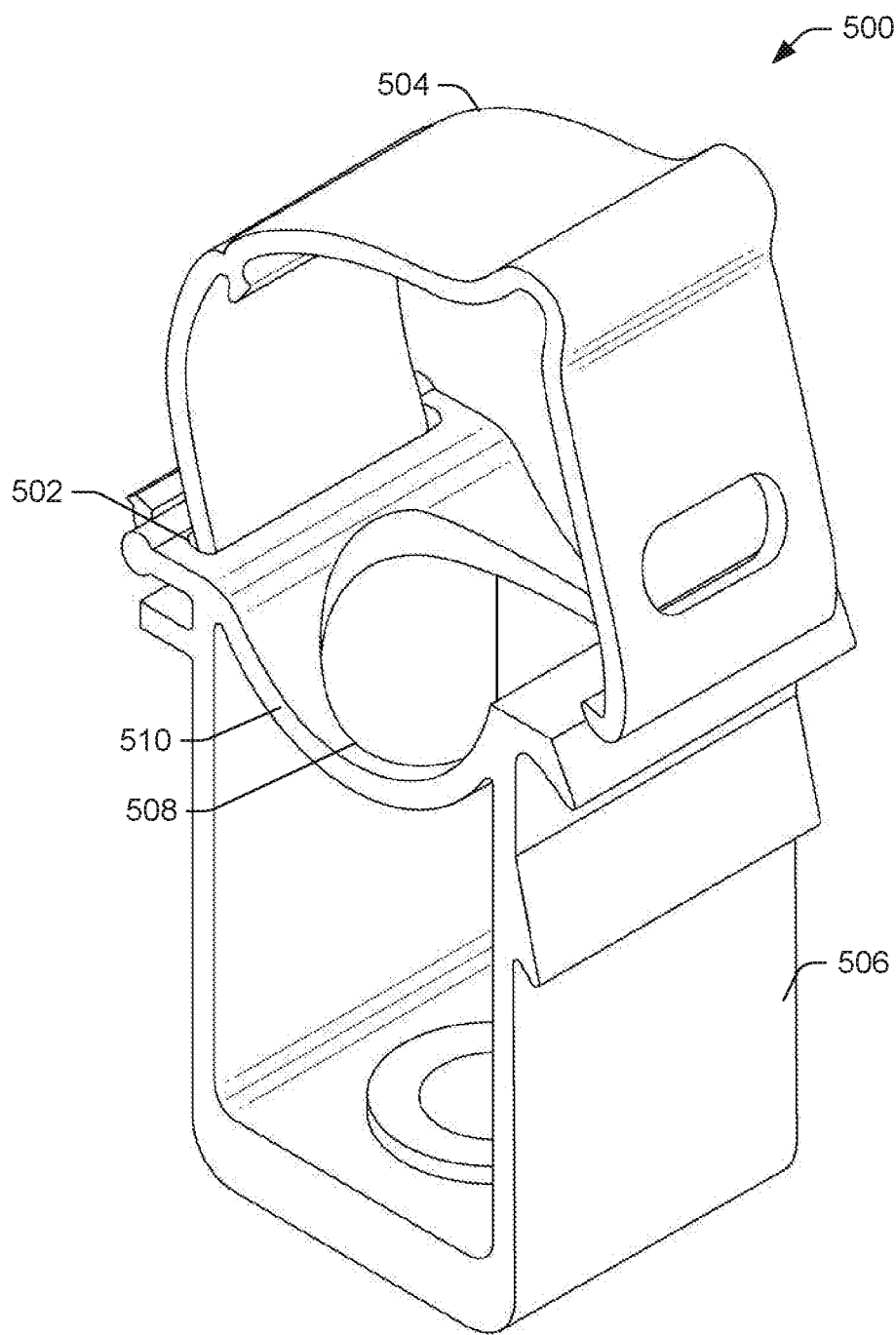
FIG. 5 is a perspective view of a conduit mount according to an embodiment of this disclosure.

FIG. 5 illustrates a perspective view of a conduit mount 500 according to an embodiment. FIG. 5 depicts the conduit mount 500 while not securing conduit therein. As described previously, the conduit mount 500 may include a slot 502 to secure a clip 504 to a bracket 506. The slot 502 may be shaped so as to receive an end of the clip 504. As shown in FIG. 5, the conduit mount 500 may further include an aperture 508 located in a cradle portion 510. The aperture 508 in the cradle portion 510 may allow a tool(s) to pass therethrough in order to allow an installer access to mounting hardware located beneath the cradle portion 510, among other reasons.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter.

What is claimed is:

1. An apparatus, comprising:
a bracket including:
a first arm extending in a first plane;
a second arm extending in a second plane that is parallel to the first plane, the second arm including a first catch and a second catch,
wherein the first catch is disposed on a distal end of the second arm and the second catch is spaced a distance from the first catch closer to a proximal end of the second arm;
a flange extending from the first arm, the flange extending away from the second arm in a transverse plane that is transverse to the first plane, the flange having a slot therethrough, and the slot being offset from the first plane;
a connecting portion extending in a direction that is transverse to the first plane, the connecting portion joining the first arm to the second arm; and
a clip including:
a first end shaped to be insertable through the slot,
a second end including a hook shaped to alternatively engage either the first catch or the second catch to attach the clip to the bracket, and
a bend formed in the clip between the first end and the second end, the bend configured to flex when the hook engages the first catch or the second catch.

2. The apparatus according to claim 1, wherein the bend is in a neutral position when the hook disengages the first catch or the second catch.

3. The apparatus according to claim 1, wherein the connecting portion includes an aperture sized to receive a fastener of mounting hardware.

4. The apparatus according to claim 1, wherein the clip further includes a planar portion disposed between the first end and the second end of the clip, the planar portion having an aperture therethrough.

5. The apparatus according to claim 1, wherein the bracket further includes a stop extending from the first arm, and wherein, when the clip is inserted into the slot on the bracket, the stop engages the first end of the clip such that the stop prevents the first end of the clip from backing out of the slot.

6. The apparatus according to claim 1, wherein the clip and the bracket are shaped to accommodate a conduit between the clip and the bracket.

7. The apparatus according to claim 6, wherein the clip is shaped such that the clip accommodates a first conduit size when the hook engages the first catch, and the clip accommodates a second conduit size when the hook engages the second catch.

8. A conduit mount, comprising:
a bracket defined at least by a first arm, a stop extending outward from the first arm, a second arm extending adjacent the first arm, and a base portion joining the first arm to the second arm, the bracket including:
a flange extending from the first arm and spaced from the stop, the flange extending in a direction away from the second arm,
a slot located on the flange and offset from the first arm,
at least one catch disposed on the second arm, and
a clip having a first end and a second end, wherein:
the first end is shaped to be insertable through the slot to retain the first end to the bracket,
the first end of the clip includes a retaining member including a tab extending outward from the retaining member, and the stop engages the tab on the retaining member to prevent the retaining member from backing out of the slot, and
a hook is disposed on the second end and shaped to engage the at least one catch.

9. The conduit mount according to claim 8, wherein the clip further includes a planar portion disposed between the first end and the second end of the clip.

10. The conduit mount according to claim 8, wherein the clip is shaped to accommodate a conduit between the clip and the bracket, and the clip further comprising a protrusion that presses against the conduit when the hook engages the at least one catch.

11. The conduit mount according to claim 8, wherein the bracket further includes a cradle portion located between the first arm and the second arm, the cradle portion shaped to accommodate at least a portion of a conduit between the first arm and the second arm.

12. The conduit mount according to claim 8, wherein the bracket further includes an aperture located in the base portion through which a fastener is insertable.

13. The conduit mount according to claim 8, wherein the at least one catch comprises at least two catches disposed on the second arm, and wherein the clip is shaped such that the clip accommodates a first conduit size when the hook engages a first catch of the at least two catches and the clip accommodates a second conduit size when the hook engages a second catch of the at least two catches.

14. The conduit mount according to claim 8, wherein the clip comprises a bend formed in the clip between the first end and the second end, the bend configured to flex when the hook engages the at least one catch.

15. The conduit mount according to claim 8, wherein the first arm extends in a first plane, the second arm extends in a second plane parallel to first plane, and the flange extends away from the second arm in a transverse plane that is transverse to the first plane.

16. A conduit mount, comprising:
a bracket defined at least by a first arm, a stop extending outward from the first arm, a second arm extending adjacent the first arm, and a base portion joining the first arm to the second arm, the bracket including:

a flange extending from the first arm and spaced from the stop, the flange extending in a direction away from the second arm, a slot located on the flange and offset from the first arm, at least one catch disposed on the second arm, and a clip having a first end and a second end, wherein:

the first end is shaped to be insertable through the slot to retain the first end to the bracket, the first end of the clip includes a retaining member, and the stop prevents the retaining member from backing out of the slot, a hook is disposed on the second end and shaped to engage the at least one catch, and the clip comprises a bend formed in the clip between the first end and the second end, the bend configured to flex when the hook engages the at least one catch.

* * * * *